(12) United States Patent
Carlson

(10) Patent No.: US 7,742,757 B2
(45) Date of Patent: Jun. 22, 2010

(54) LOCATION ANNOUNCEMENT FOR MOBILE DEVICES

(75) Inventor: Steven I. Carlson, Kenmore, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 53 days.

(21) Appl. No.: 10/685,616

(22) Filed: Oct. 14, 2003

(65) Prior Publication Data

US 2005/0079875 A1    Apr. 14, 2005

(51) Int. Cl.
*H04M 3/42* (2006.01)
(52) U.S. Cl. .................................. 455/414.2
(58) Field of Classification Search ............. 455/414.2, 455/414.4, 433, 456, 456.5, 457, 461, 569.1, 455/456.1, 456.3
See application file for complete search history.

(56) References Cited

U.S. PATENT DOCUMENTS

| | | | | |
|---|---|---|---|---|
| 5,625,668 A * | 4/1997 | Loomis et al. | ............. | 455/456.5 |
| 5,727,057 A * | 3/1998 | Emery et al. | ............. | 379/201.07 |
| 5,771,283 A * | 6/1998 | Chang et al. | ............. | 379/142.01 |
| 5,850,435 A * | 12/1998 | Devillier | ............. | 379/374.02 |
| 6,002,936 A * | 12/1999 | Roel-Ng et al. | ............. | 455/456.4 |
| 6,049,718 A * | 4/2000 | Stewart | ............. | 455/456.4 |
| 6,169,899 B1 * | 1/2001 | Havinis et al. | ............. | 455/433 |
| 6,185,426 B1 * | 2/2001 | Alperovich et al. | ....... | 455/456.1 |
| 6,198,935 B1 * | 3/2001 | Saha et al. | ............. | 455/456.2 |
| 6,233,325 B1 * | 5/2001 | Frech et al. | ............. | 379/142.06 |
| 6,353,664 B1 * | 3/2002 | Cannon et al. | ............. | 379/142.1 |
| 6,434,126 B1 * | 8/2002 | Park | ............. | 370/328 |
| 6,813,494 B2 * | 11/2004 | Easley | ............. | 455/433 |
| 6,823,048 B2 * | 11/2004 | Gillespie | ............. | 379/88.19 |
| 6,839,022 B1 * | 1/2005 | Benco et al. | ............. | 342/357.1 |
| 7,012,999 B2 * | 3/2006 | Ruckart | ............. | 379/88.21 |
| 7,020,267 B2 * | 3/2006 | Kryvossidis et al. | ... | 379/221.13 |
| 7,085,578 B2 * | 8/2006 | Barclay et al. | ............. | 455/457 |
| 2002/0012425 A1 * | 1/2002 | Brisebois et al. | ....... | 379/142.01 |
| 2002/0042277 A1 * | 4/2002 | Smith | ............. | 455/456 |
| 2002/0085687 A1 * | 7/2002 | Contractor et al. | ............. | 379/76 |
| 2002/0164974 A1 * | 11/2002 | Kwan et al. | ............. | 455/412 |
| 2003/0016804 A1 * | 1/2003 | Sheha et al. | ............. | 379/201.06 |
| 2003/0104812 A1 * | 6/2003 | Easley | ............. | 455/433 |
| 2004/0185865 A1 * | 9/2004 | Maanoja | ............. | 455/452.2 |
| 2004/0203613 A1 * | 10/2004 | Zhu et al. | ............. | 455/412.1 |
| 2004/0203629 A1 * | 10/2004 | Dezonno et al. | ......... | 455/414.1 |
| 2004/0209605 A1 * | 10/2004 | Urban et al. | ............. | 455/415 |
| 2006/0029209 A1 * | 2/2006 | Moton et al. | ............. | 379/374.02 |

* cited by examiner

*Primary Examiner*—Melody Mehrpour
(74) *Attorney, Agent, or Firm*—Moazzam & Associates, LLC

(57) ABSTRACT

A network includes a switch and at least one network element to track the locations of wireless devices that interact with the network. The network further includes at least one network element to convert location information for a wireless device obtained from the at least one network element to track locations to a voice announcement, and to interact with the switch to provide the announcement to at least one of a calling wireless device and a called wireless device.

9 Claims, 7 Drawing Sheets

LOCATION ANNOUNCEMENT FOR MOBILE DEVICES

TECHNICAL FIELD

The present disclosure relates to providing location information about a wireless device.

BACKGROUND

Wireless telephones are devices capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the terms 'wireless device' and 'mobile device' are meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

A network that serves wireless devices may provide a location service. For example, mapAMobile provides such a service in the United Kingdom. The location service may make it possible to geographically locate wireless devices that interact with the network. For example, the network may identify the location of a caller's wireless device (e.g. "Gillman Street in Redmond, Wash.") and provide this location information to a called party's wireless device. However, due to constraints in the amount of data that may be communicated during an arriving call, it remains a challenge to provide location information to wireless devices in a manner that is both timely and detailed.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A network includes a switch and at least one network element to track the locations of wireless devices that interact with the network. The network also includes at least one network element to convert location information to a voice announcement, and to interact with the switch to provide the announcement to at least one of a calling wireless device and a called wireless device.

The network element to track the locations of wireless devices that interact with the network may be a Gateway Mobile Location Center (GMLC). The network element to convert the location information to a voice announcement, and to interact with the switch to provide the announcement to at least one of a calling wireless device and a called wireless device, may be an Intelligent Peripheral (IP).

The network may further include a network element to obtain name information corresponding to at least one of the calling wireless device and a called wireless device, and the network element to provide the announcement may convert the name information and the location information to the voice announcement.

The network element to obtain name information may be a Line Information Database (LIDB).

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
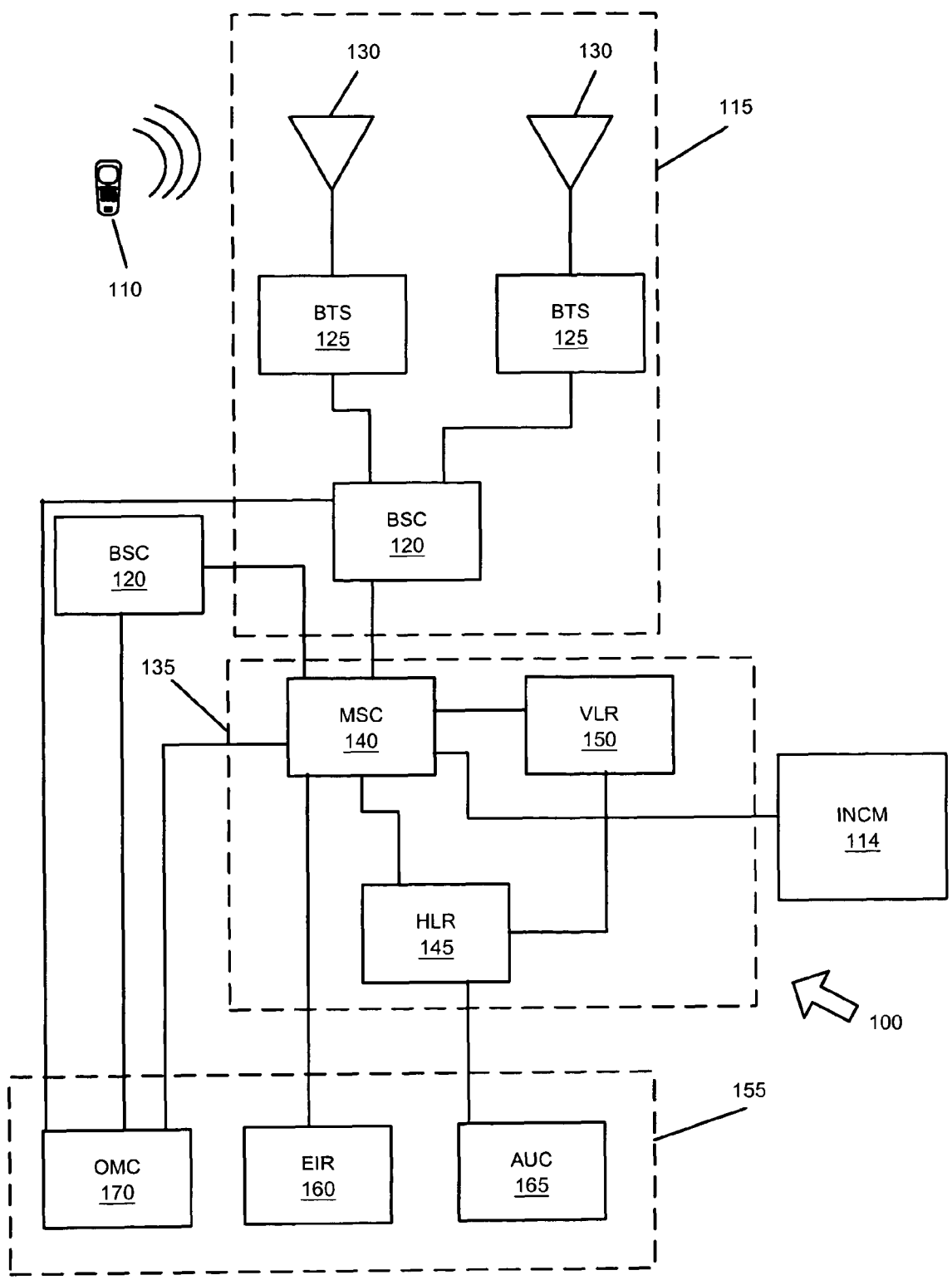
FIG. 1 is a block diagram of an embodiment of a wireless network.

FIG. 1 is a block diagram of an embodiment of a wireless network. A wireless device 110 communicates with a base station subsystem (BSS) 115 comprising base station controllers (BSC) 120 coupled to one or more base transceiver stations (BTS) 125. In turn, each BTS 125 is coupled to one or more antennae 130.

The BTS 125 includes transmitting and receiving equipment to create a radio interface between the wireless network and terminal devices. Although the antennae 130 are shown as separate elements for clarity, it is common in the industry to collectively refer to the antennae 130, transmitter, and receiver, as the BTS.

The BSC 120 may perform management of the radio interface by allocating channels, managing handover from one BTS to another, paging the wireless device, and transmitting connection-related signaling data.

The networking and switching subsystem (NSS) 135 of a wireless network comprises a Mobile Switching Center (MSC) 140, a Home Location Registry (HLR) 145, and a Visitor Location Registry (VLR) 150. Switching and network management functions are carried out by the NSS 135. The NSS 135 may also act as a gateway between the wireless network and other networks such as the Public Switched Telephone Network (PSTN), Integrated Services Digital Network (ISDN), the Internet, other wireless networks, and the Public Data Network (PDN). These other networks are collectively referred to as Internetwork Communication Media (INCM) 114.

The MSC 140 is a switching mechanism that routes communications and manages the network. In GPRS networks, GPRS support nodes (GSNs) such as Switching GSNs (SG-SNs) and Gateway GSNs (GGSNs) may provide switching operations similar to those provided by the MSC 140. There can be many switches 140 in a communication network, each responsible for the signaling required to set up, maintain, and terminate connections to wireless devices within the geographical area served by the switch 140. Each MSC (switch) 140 may manage several BSC 120. The MSC 140 is coupled to a Home Location Registry (HLR) 145 and a Visitor Location Registry (VLR) 150. The HLR 145 is also coupled to the VLR 150. The HLR 145 and VLR 150 may comprise certain dynamic or temporary subscriber data such as current Location Area (LA) of the subscriber's mobile station and Mobile Station Roaming Number (MSRN). Subscriber-related data is recorded in the HLR 145 from which billing and administrative information is extracted when needed by the cellular service provider. Some wireless networks have only one HLR 145 that serves all subscribers; others have multiple HLRs.

The MSC 140 uses the VLR 150 to manage the wireless devices that are currently roaming in the area controlled by the MSC 140. The VLR 150 stores information such as the International Mobile Subscriber Identity (IMSI), authentication data, and telephone number of the roaming wireless devices. The VLR 150 may obtain and comprise subscriber information, such as information about the services to which a roaming wireless device is entitled, from the HLR that serves the wireless device. The VLR 150 controls a pool of MSRN and allocates an MSRN and TMSI to the roaming wireless device. The VLR 150 sends the MSRN and Temporary Mobile Subscriber Identity (TMSI) information to the HLR 145 where they are stored with the subscriber's dynamic records for later use in call routing.

The operation subsystem (OSS) 155 may include an Equipment Identity Register (EIR) 160, an Authentication Center (AuC) 165, and an Operating and Maintenance Center (OMC) 170. The OSS 155 may provide subscription management, network operation, network maintenance, and mobile equipment management.

The AuC 165 stores data related to network security and authentication of wireless devices and subscribers. A purpose of the AuC 165 is to prevent fraud by verifying the identity of subscribers and/or devices that try to access the network. Thus the AuC 165 may comprise authentication algorithms and encryption codes necessary to protect a subscriber's access rights and identity and to prevent eavesdropping.

The EIR 160 is a database which stores International Mobile Equipment Identity (IMEI) numbers. Wireless devices are uniquely identified by an IMEI or equivalent number such as an Electronic Serial Number (ESN). An EIR 160 generally indicates the status of a particular wireless device by flagging the IMEI of a device identified stolen, suspended, or malfunctioning.

The OMC 170 monitors and controls other network elements (any one or more devices that participate at least occasionally in the operation of the network) to enhance system performance and quality. The OMC 170 also administers billing, subscriber service data, and generation of statistical data on the state and capacity of the network.

Figure 2:
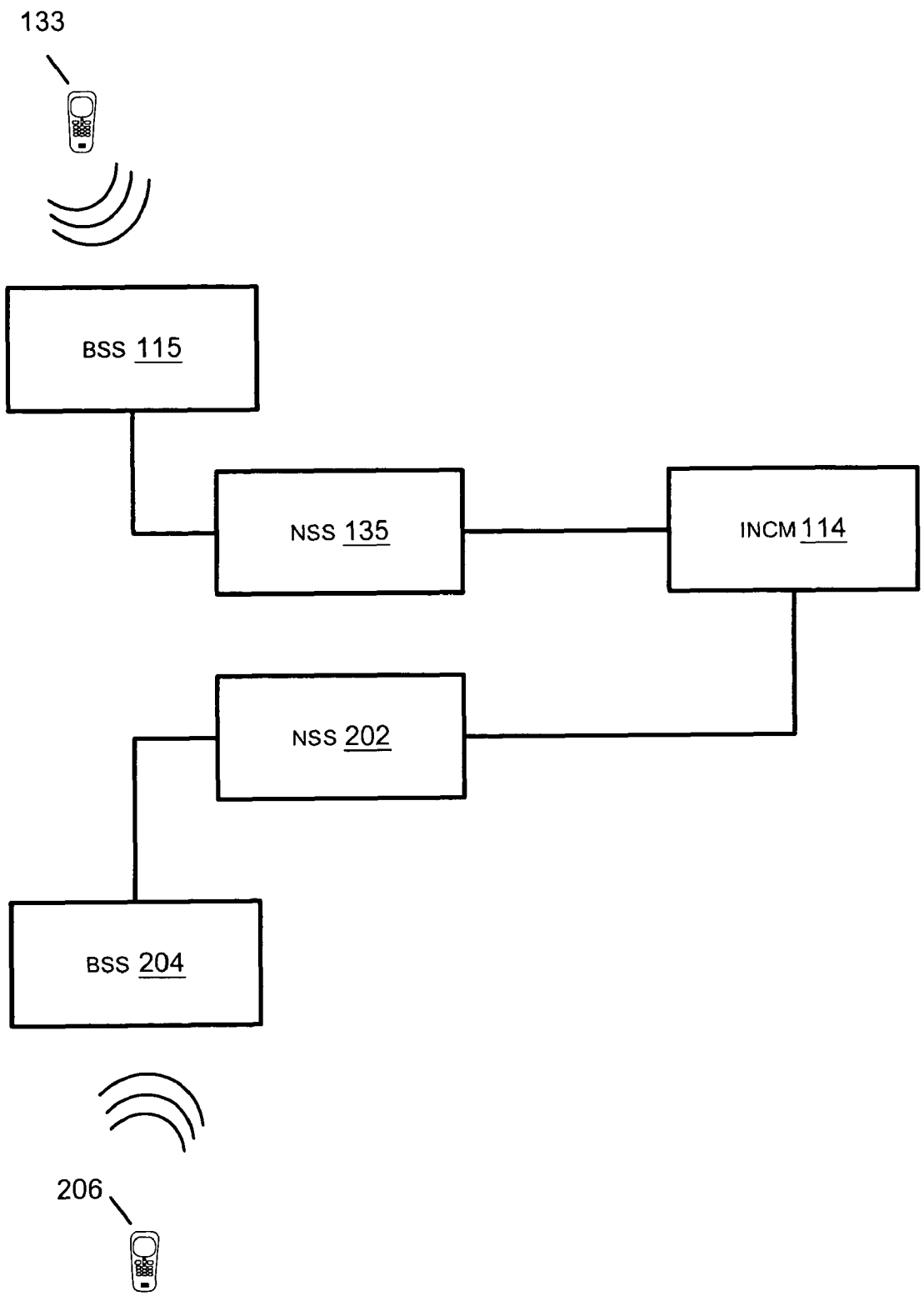
FIG. 2 is a block diagram of an embodiment of a wireless network involving multiple base station subsystems and network switching subsystems.

FIG. 2 is a block diagram of an embodiment of a wireless network involving multiple base station subsystems and network switching subsystems. A first wireless device 110 communicates with a second wireless device 206. The first wireless device communicates with a first NSS 135 by way of a first BSS 115. The INCM 114 couples the first NSS 135 with a second NSS 202. The second NSS 202 may be part of a network operated by a different provider (e.g. AT&T Wireless™, Verizon Wireless™, and so on) than the first NSS 135. The first and second NSS 135,202 may communicate without use of the INCM 114 when part of a network operated by the same provider. A second wireless device 206 communicates with the second NSS 202 by way of a second BSS 204.

Figure 3:
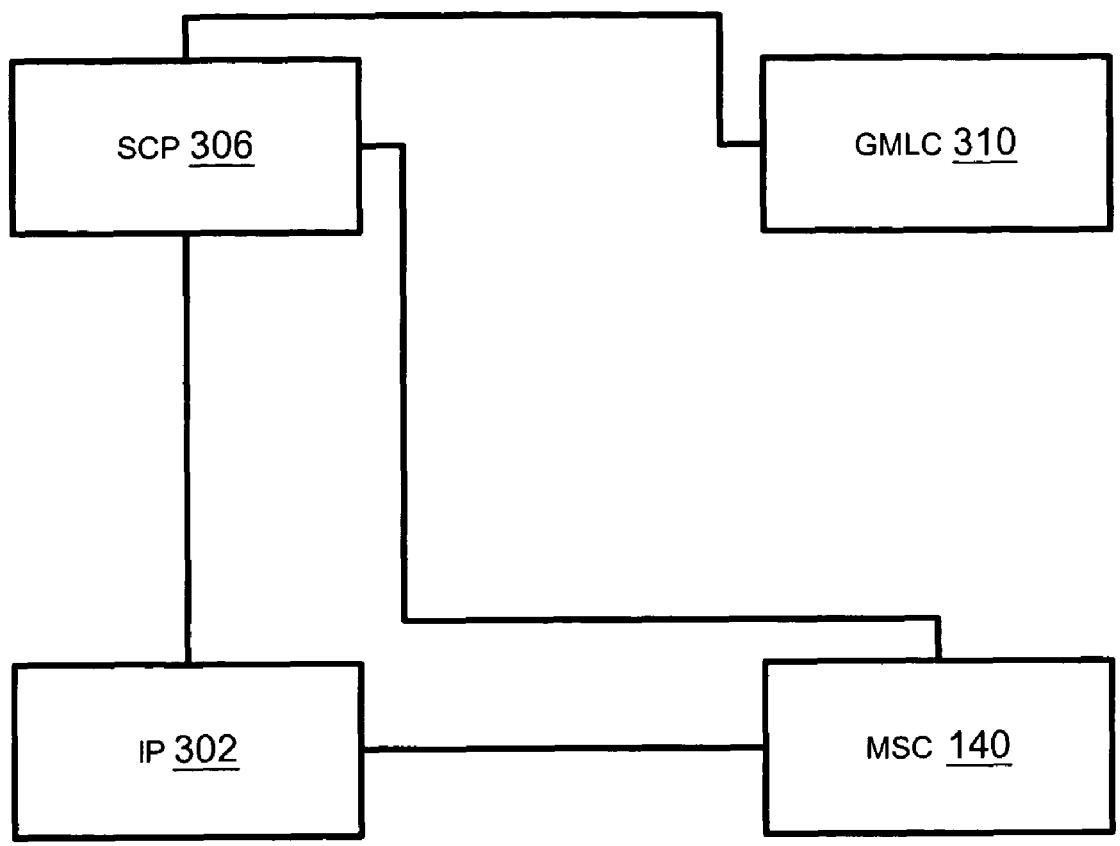
FIG. 3 is a block diagram of an embodiment of an arrangement to provide location announcement.

FIG. 3 is a block diagram of an embodiment of an arrangement to provide location announcement. The MSC 140 is coupled to a service control point (SCP) 306 and an Intelligent Peripheral (IP) 302. The SCP 306 is a network element that is configured with the MSC 140 to become involved with communication events. For example, the SCP 306 may register with the MSC 140 such that the MSC 140 involves the SCP 306 in the process of completing a call. The IP 302 is a network element that can communicate with the MSC 140 to provide additional capabilities in the network. For example, the IP 302 can be designed to intervene in a typical call setup process to provide announcements.

The SCP 306 is coupled to a Gateway Mobile Location Center (GMLC) 310. The GMLC 310 comprises information about the location of wireless devices that interact with the network. The GMLC 310 may receive this information from various BSS throughout the network. For example, the GMLC 310 may receive information about the location of the wireless device 110 via BSS 115. In some embodiments, functionality of the GMLC 310 may be provided by elements of the BSS 115 and NSS 135.

In another embodiment, the SCP 306 may be coupled to the GMLC 310 by way of a portal. The portal provides an interface between network protocols and services, and Internet protocols and services. For example, the portal could provide an interface whereby communications using Internet Protocol (IP), Hypertext Transfer Protocol (HTTP), or File Transfer Protocol (FTP), to name just a few, result in requests for network services via Signaling System 7 (SS7) or other network communication methods.

Figure 4:
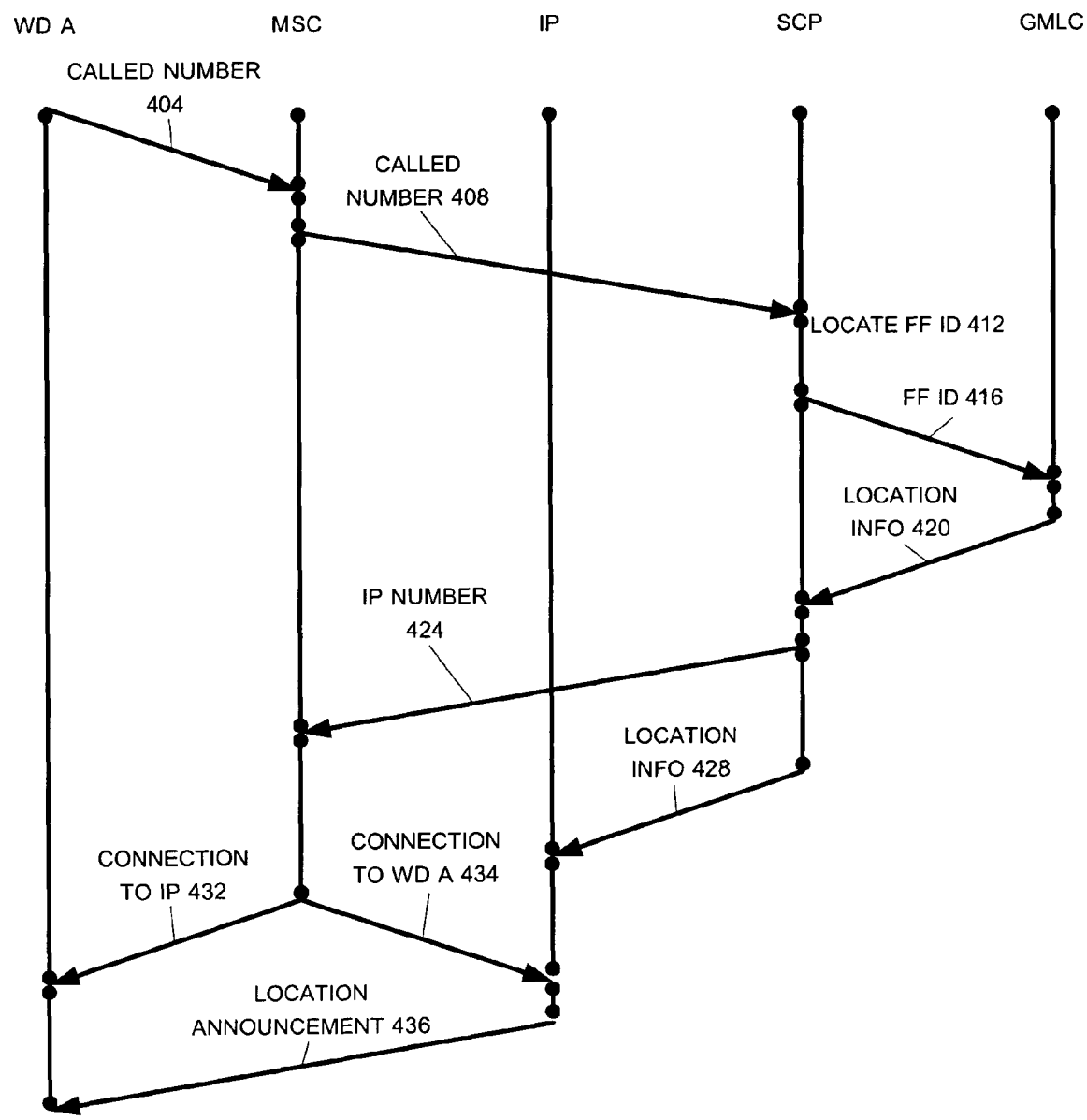
FIG. 4 is an action diagram of an embodiment of a method to provide location announcement to a caller.

FIG. 4 is an action diagram of an embodiment of a method to provide location announcement to a caller. At 404 a first wireless device (WD A) provides to an MSC a called number (an identifier, such as a phone number, of the device or party to call). The SCP is configured to be involved in the establishment of calls, and thus at 408 the MSC provides the called number 408 to the SCP.

At 412 the SCP locates a Friend Finder ID (FF ID) corresponding to the called number. The FF ID is an identification that is used by a GMLC to identify the mobile device for purposes of location. In some embodiments, the FF ID may be the caller's phone number, MSISDN, or other identification of the wireless device employed by the caller.

At 416 the FF ID is provided by the SCP to the GMLC. At 420 the GMLC returns to the SCP location information for a wireless device corresponding to the FF ID. At 424, the SCP provides a number (such as a routing number) of the IP to the MSC. At 428 the SCP provides the location information to the IP.

The MSC may now connect the IP to make voice announcements to the wireless device that made the call. At 432 and 434 the MSC makes a voice connection between the IP and the wireless device that made the call. The IP converts the location information into a voice announcement of the called party's location, for example using Text-to-Speech (TTS) conversion technology. At 436 the announcement is provided to the caller, e.g. "The person you called is at Gilman Street in Redmond, Wash.".

In another embodiment, the SCP may invoke the Calling Name Address Presentation (CNAP) service, using the called number, in order to provide a name of the called party, as well as their location, to the IP. The IP may then convert the location information and name information to voice information, forming an announcement including the called party's name, e.g. "Joe Baker is at Gilman Street in Redmond, Wash.". For example, the SCP may interact with a Line Information Database (LIDB), a network element sometimes employed in communication networks to provide CNAP services. The SCP may provide the called number to the LIDB, which returns a corresponding name. In some embodiments, functionality of the LIDB may be provided by network elements of the NSS 135 ( e.g. the HLR 145) and/or the OSS 155 (e.g. the EIR 160 or AuC 165).

Prior to, during, or after the announcement, the IP and/or the SCP may interact with the MSC to establish a connection between the calling and called parties, using, for example, known techniques of Customized Applications for Mobile Networks (CAMEL).

Figure 5:
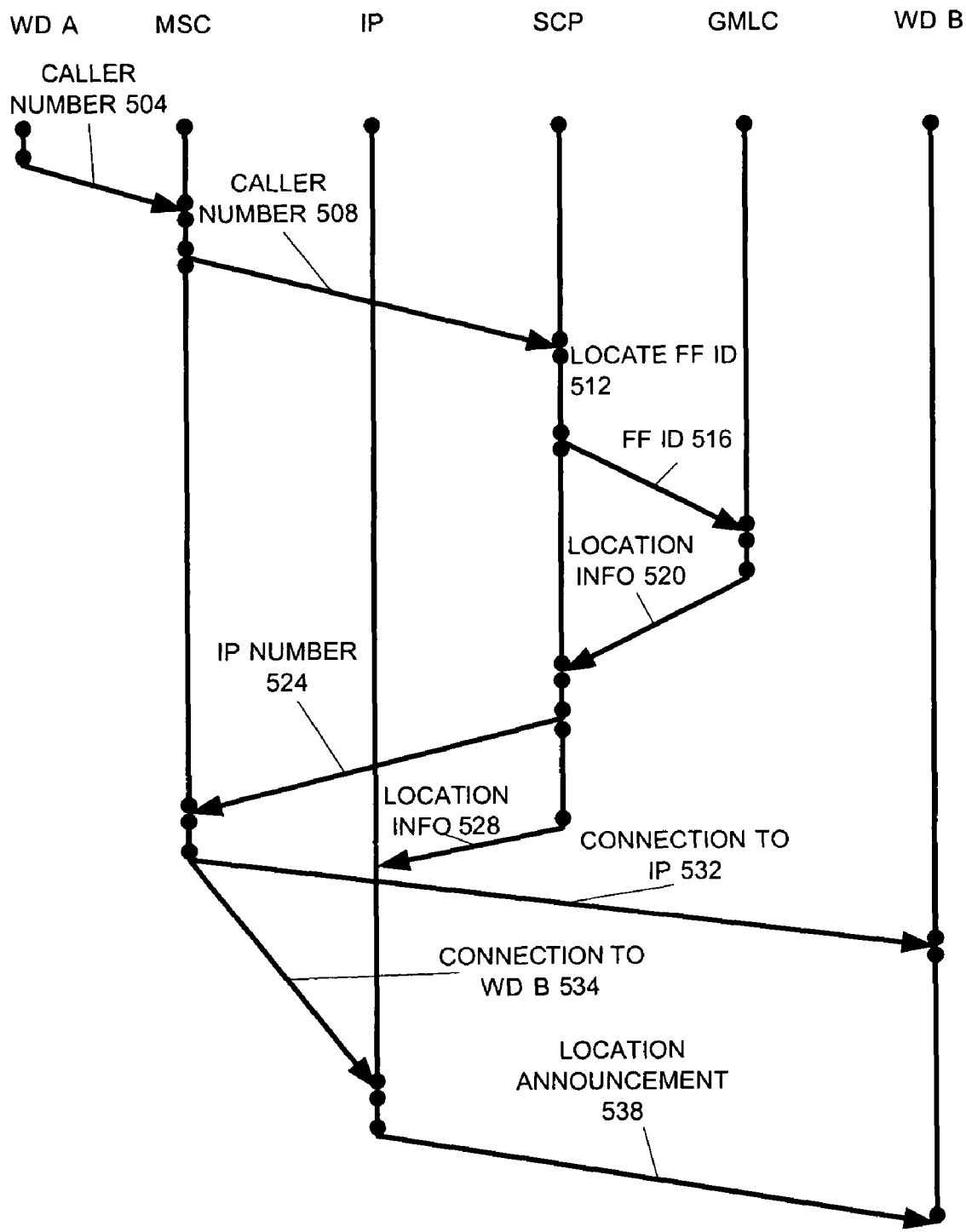
FIG. 5 is an action diagram of an embodiment of a method to provide location announcement to a called party.

FIG. 5 is an action diagram of an embodiment of a method to provide location announcement to a called party. At 504 the calling wireless device (WD A) provides to an MSC a caller number (an identifier, such as a phone number, of the device or party making the call). The SCP has registered to be involved in the establishment of calls, and thus at 508 the MSC provides the called number 508 to the SCP.

At 512 the SCP locates a Friend Finder ID (FF ID) corresponding to the caller number. At 516 the FF ID is provided by the SCP to the GMLC. At 520 the GMLC returns to the SCP location information for a wireless device corresponding to the FF ID. At 524, the SCP provides a number (such as a routing number) of the IP to the MSC. At 528 the SCP provides the location information to the IP.

The MSC may now connect the IP to make voice announcements to the wireless device that receives the call. At 532 and 534 the MSC makes a voice connection between the IP and the wireless device that receives the call. The IP converts the location information into a voice announcement of the calling party's location, for example using Text-to-Speech (TTS) conversion technology. At 538 the announcement is provided to the called wireless device, e.g. "The caller is at Gilman Street in Redmond, Wash.".

In another embodiment, the SCP may invoke the CNAP service in order to provide a name of the calling party, as well as their location, to the IP. The IP may then convert the location information and name information to voice information, forming an announcement including the called party's name, e.g. "Joe Baker is calling from Gilman Street in Redmond, Wash.". The SCP may provide the caller's number to the LIDB, which returns a corresponding name.

Prior to, during, or after the announcement, the IP and/or the SCP may interact with the MSC to establish a connection between the calling and called parties, using, for example, known techniques of Customized Applications for Mobile Networks (CAMEL).

Figure 6:
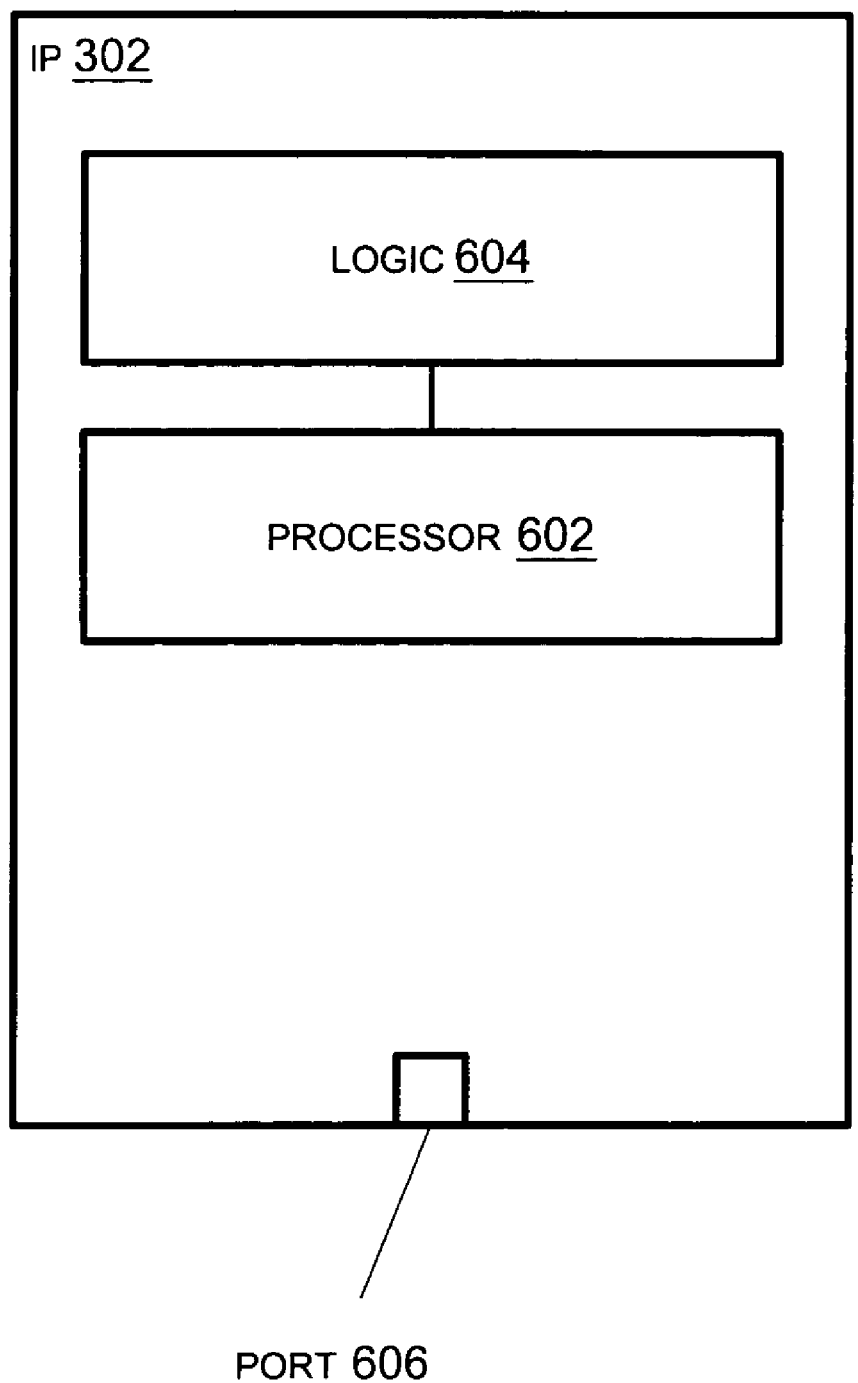
FIGS. 6 and 7 are block diagrams of embodiments of an intelligent peripheral and a service control point, respectively.
Figure 7:
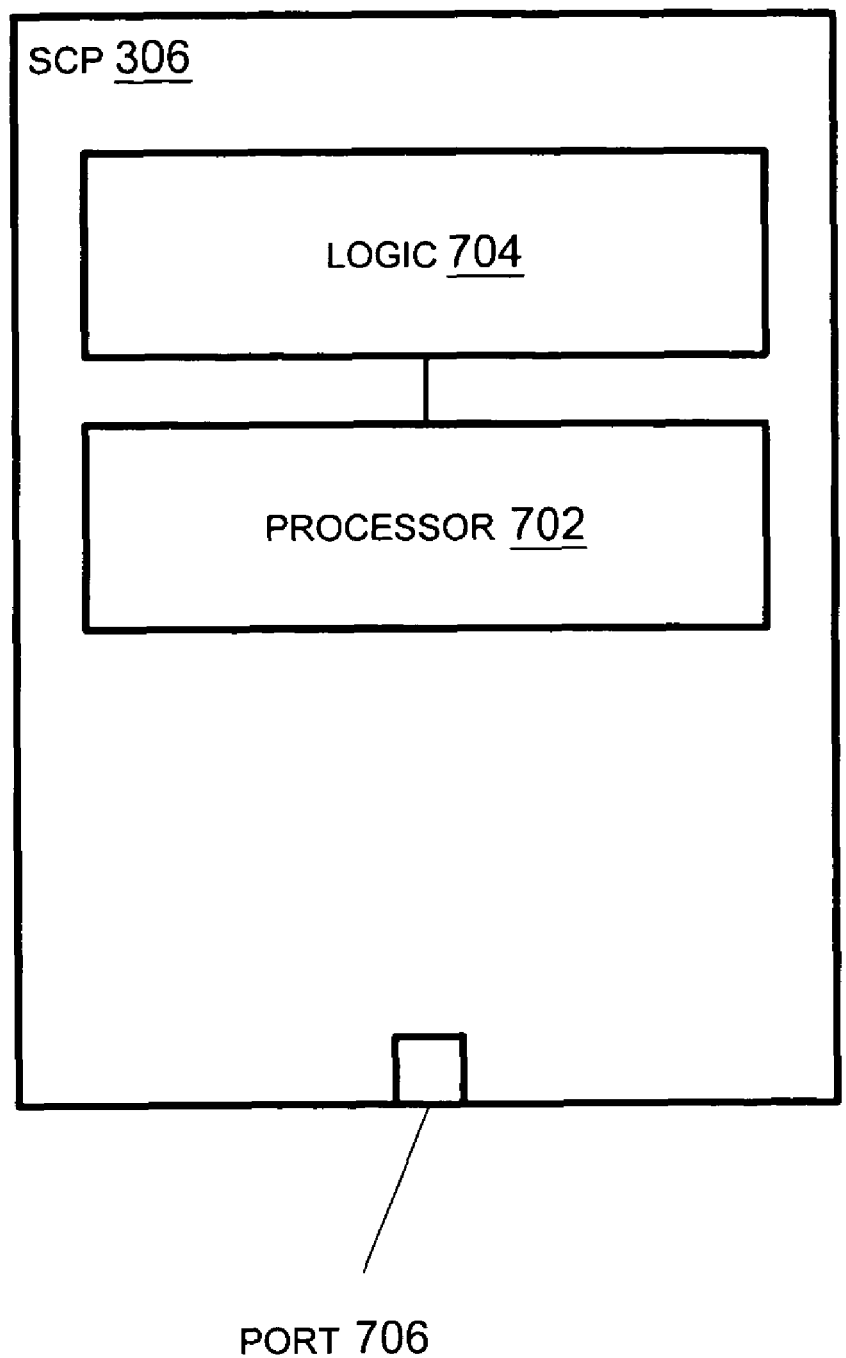

FIGS. 6 and 7 are block diagrams of embodiments of an intelligent peripheral and a service control point, respectively. The IP 302 comprises a processor 602 and logic 604 that, when applied to the processor 602, results in acts of the IP 302 as described herein. The IP 302 comprises a port 606 by which interactions may take place with a switch (such as MSC 140), the SCP 306, and possibly other network elements as well.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

The SCP 306 comprises a processor 702 and logic 704 that, when applied to the processor 702, results in acts of the SCP 306 as described herein. The SCP 306 comprises a port 706 by which interactions may take place with a switch (such as MSC 140), the IP 302, the GMLC 310, and possibly other network elements as well.

What is claimed is:

1. A method of providing location information of a wireless device through a voice announcement comprising:
    obtaining location information for a caller having a first wireless device from a Gateway Mobile Location Center during establishment of a call to a called party having a second wireless device;
    providing the location information to an intelligent peripheral,
        wherein the intelligent peripheral converts the location information to a first voice information;
    obtaining name information for the caller from a name database, wherein the name database relates wireless device information to name information;
providing the name information to the intelligent peripheral,
wherein the intelligent peripheral converts the name information to a second voice information;
connecting the intelligent peripheral to the second wireless device through a voice connection,
wherein the intelligent peripheral announces the first and second voice information from the intelligent peripheral to the second wireless device; and connecting the called party to a calling party.

2. The method of claim 1, further comprising:
obtaining the name information using Calling Name Address Presentation (CNAP).

3. A method of providing location information of a wireless device through a voice announcement comprising:
obtaining location information for a called party from a Gateway Mobile Location Center during establishment of a call from a caller having a first wireless device to a called party having a second wireless device;
providing the location information to an intelligent peripheral,
wherein the intelligent peripheral converts the location information to a first voice information;
obtaining name information for the called party from a name database,
wherein the name database relates wireless device information to name information;
providing the name information to the intelligent peripheral,
wherein the intelligent peripheral converts the name information to a second voice information;
connecting the intelligent peripheral to the first wireless device through a voice connection,
wherein the intelligent peripheral announces the first and second voice information from the intelligent peripheral to the second wireless device; and connecting the calling party to the called party.

4. The method of claim 3, further comprising:
obtaining the name information using Calling Name Address Presentation (CNAP).

5. A network comprising:
a switch;
a Gateway Mobile Location Center to track the locations of wireless devices that interact with the network; and
at least one Intelligent Peripheral (IP) coupled to a Mobile Service Center to convert location information for a calling wireless device obtained from the Gateway Mobile Location Center which tracks locations to a first voice announcement, to convert name information for a calling party obtained from a database relating wireless device information to name information to a second voice announcement, and to interact with the switch to provide the first and second voice announcements to at least one called wireless device over a voice connection; and at least one network element to establish a call between the calling wireless device and the called wireless device.

6. The network of claim 5, the at least one network element to obtain name information further comprising:
a Line Information Database (LIDB).

7. A network element comprising:
a processor;
at least one port; and
logic that, when applied to the processor, results in converting location information and name information for a calling wireless device to a voice announcement, and interacting via the at least one port with a switch to provide the voice announcement to at least one called wireless device during the establishment of a call between the calling wireless device and the called wireless device, wherein the location information is provided from a Gateway Mobile Location Center, the name information is provided from a database relating wireless device information to name information, and the voice announcement to the at least one called wireless device is made through a voice connection between the network element and the at least one called wireless device.

8. A network element comprising:
a processor;
at least one port; and
logic that, when applied to the processor, results in the network element becoming involved in the establishment of a call, obtaining via the at least one port location information for a caller from a Gateway Mobile Location Center that provides location information, obtaining via the at least one port name information for a caller from a database relating wireless device information to name information, and providing via the at least one port the location information and name information to a network element that creates a voice announcement including the location and name information and delivers the voice announcement to a called wireless device over a voice connection between the network element and the called wireless device.

9. A network element comprising:
a processor;
at least one port; and
logic that, when applied to the processor, results in the network element becoming involved in the establishment of a call, and results in obtaining via the at least one port location information and name information for a called party from a Gateway Mobile Location Center that provides a name service, and providing via the at least one port the location information and name information to a network element that creates a voice announcement of the name information and the called party's location and delivers the voice announcement to a calling wireless device over a voice connection between the network element and the calling wireless device.

* * * * *